July 25, 1961 A. CHIAPUZIO, JR., ET AL 2,994,062
COINCIDENCE DETECTOR
Filed Feb. 27, 1958
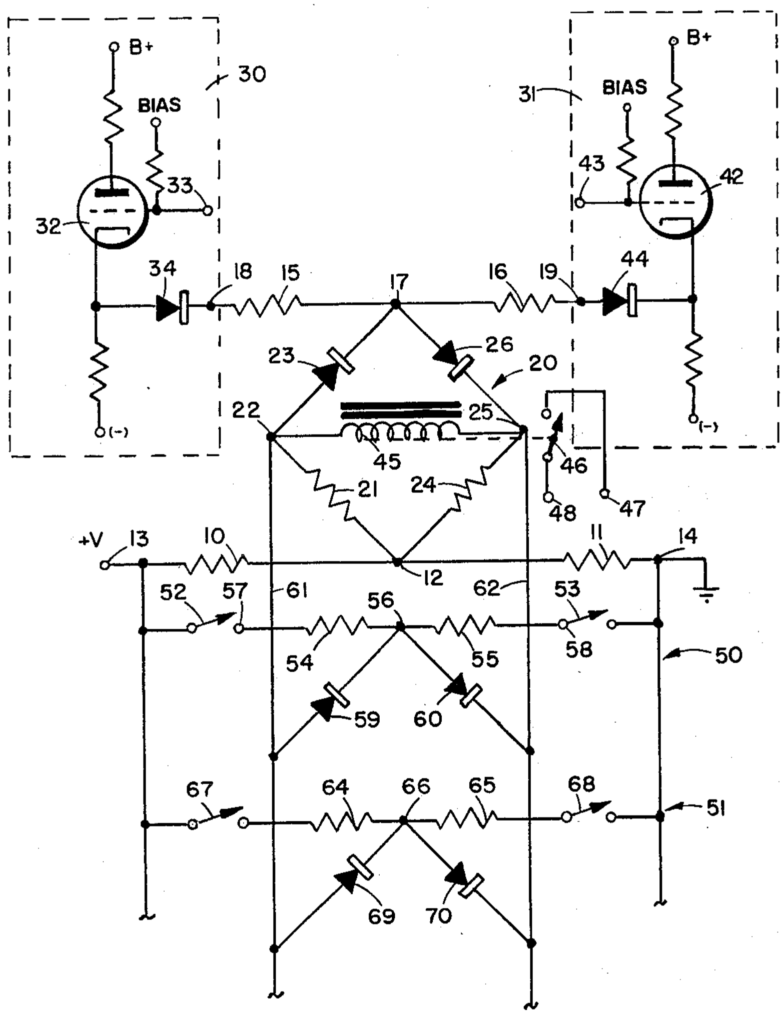
INVENTORS.
ANTON CHIAPUZIO, Jr.
GLENN H. SHAW
BY
Allan Rothenberg
ATTORNEY United States Patent Office 2,994,062

Patented July 25, 1961

2,994,062

COINCIDENCE DETECTOR

Anton Chiapuzio, Jr., Downey, and Glenn H. Shaw, East Whittier, Calif., assignors to North American Aviation, Inc.

Filed Feb. 27, 1958, Ser. No. 717,979

7 Claims. (Cl. 340—149)

This invention relates to coincidence detectors and particularly concerns apparatus for providing an affirmative indication of coincidence of either the presence or absence of each of a pair of signals.

In apparatus for handling of information, particularly information expressed in digital form, it is often necessary to provide an affirmative indication of coincidence or lack of coincidence of each of a pair of data units. Data may be expressed either mechanically, electrically or magnetically in binary form by the physical condition of a mechanical element or by the electrical or magnetic state of a switch or magnetic record element. In punched card apparatus, for example, a unit of data is represented in binary form by the presence or absence of a hole at a particular point of the punched card. In such apparatus each card may be identified by a group of such binary data units comprising the "tag number" of the card. Thus, the identity of any card may be verified by comparing binary card tag numbers with a given number. Such tag number comparison may be utilized to check card sequence, for example, by comparing the tag numbers of successive cards or it may be utilized to search for a particular card by sequentially comparing tag numbers of each of a group of cards with the number of the card to be selected. Basically, the comparison comprises the detection of coincidence between a pair of electrical signals which respectively represent one bit or binary digit of each of the sets of data or numbers to be compared. Since a number will generally include a plurality of data units or bits, detection of coincidence between all corresponding bits of the two data groups is effected to obtain the coincidence detection. It will be seen that the coincidence detection should provide the same output for both conditions of coincidence. In other words, the output must be the same whether both input signals are plus (indicating a hole, for example) or minus (indicating absence of a hole). Conversely, a distinctly different detector output must be provided for the two conditions of lack of coincidence (plus and minus or minus and plus). In the parallel or simultaneous handling of data there may be required a large number of coincidence detecting channels, there being one channel for each bit of the numbers to be compared. Thus, it is desirable that the individual coincidence detector have as few components as possible and most conveniently lend itself to a simplified combination with a number of other similar detectors.

Plural relay arrangements which are presently utilized for this type of coincidence detection embody a pair of relays for each detector and inherently incorporate a number of undesirable features. Two relatively expensive relays are required for each detector. The operation of relays is relatively slow due to the mechanical nature of the device and, furthermore, reliability of relays is low.

It is accordingly an object of this invention to provide a coincidence detector which is inexpensive and reliable, yields instantaneous results with few components and is inherently adapted for more convenient combination with a number of other similar detectors.

In accordance with the present invention, there is provided a voltage divider and first and second switch controlled unidirectional circuit paths of predetermined impedance between an intermediate point of the divider and the respective end portions thereof. The controlling switches are themselves the inputs to be compared or are actuated thereby. The signals in the two unidirectional paths are thus controlled in accordance with the state or condition of the input controlling switch individual thereto whereby comparison of the signals in such two paths will indicate the relation between switch conditions. In a disclosed embodiment of the invention the two paths are arranged in a bridge circuit having inputs from intermediate terminals of two voltage dividers. The potentials at the ends of one of the dividers are fixed while the potentials at the ends of the other divider are controlled respectively by the respective signals to be compared. The circuit components are so arranged that the bridge output terminals produce no output signals whether both input signals or input switching devices are in one condition or the other. However, when the condition of the input switching devices differ from each other a signal will appear no matter which of the conditions of difference exists. The circuit is so arranged that additional coincidence detecting channels may be provided simply by connecting an additional switch controlled divider and a pair of unidirectional devices for each such additional channel to the original bridge whereby the original bridge output terminals will detect coincidence in all of the detector channels simultaneously or lack of coincidence in any channel.

An object of this invention is to improve the detection of coincidence between two signals.

A further object of the invention is to provide a coincidence detector which is inherently adapted to detect coincidence of a substantially unlimited number of additional input signal pairs with a minimum of additional circuitry.

Further objects of this invention will become apparent from the following description taken in connection with the accompanying drawing, in which the single figure of the drawing illustrates the schematic circuit diagram of a plural channel coincidence detector constructed in accordance with the principles of this invention.

In the drawing like numerals refer to like parts.

As illustrated in the drawing a first voltage divider comprising resistors 10 and 11 connected together at intermediate terminal 12 has the end terminals 13 and 14 thereof connected to opposite sides of a suitable fixed potential source illustrated as +V and ground respectively. A second voltage divider comprising resistors 15 and 16 connected together at intermediate terminal 17 has end terminals 18 and 19 to which the input signals to be compared are respectively applied. A bridge circuit 20 having input terminals at points 12 and 17 is arranged to provide a pair of oppositely directed unidirectional current paths between the intermediate divider terminals 12 and 17. The first path comprises resistor 21 connected between intermediate terminal 12 and a bridge output terminal 22 and a unidirectional device such as diode 23 having its anode connected to output terminal 22 and its cathode connected to intermediate terminal 17. The second path comprises resistor 24 connected between terminal 12 and the second bridge output terminal 25 and a unidirectional device such as diode 26 having its cathode connected to terminal 25 and its anode connected to intermediate terminal 17.

The detector is arranged to indicate coincidence of the conditions of a pair of switches 30 and 31 which may be of any suitable type for selectively controlling the potentials at the terminals 18 and 19 of the upper or switch controlled voltage divider. Any of the many well-known switching devices may be utilized to selectively switch the potential at input terminal 18 between a voltage equal to the potential +V at terminal 13 and some lower potential or a floating arrangement. Similarly, the switch 31 may be of any type which will selectively control the potential at detector input terminal 19 between a potential equal to or less than the ground potential of terminal 14 and a higher or floating potential. For purposes of exposition the switch 30 is illustrated as a cathode follower unit 32 having an input control terminal 33 and a diode 34 connected between its cathode and input terminal 18. Thus, with a positive control signal at terminal 33 the cathode follower will conduct to close the switch 30 and provide a voltage equal to +V at its cathode which is coupled through diode 34 to input terminal 18. Conversely, a negative signal at control grid terminal 33 will cut off the cathode follower to open the switch 30 whereby diode 34 is back biased and cut off. Similarly, the switch 31 may comprise a cathode follower unit 42 having a grid control terminal 43 and a diode 44 coupled between its cathode and the second detector input terminal 19. With a negative signal at control grid terminal 43 the cathode follower 42 is cut off to close switch 31 whereby a ground potential at the cathode of the cathode follower is coupled through diode 44 to input detector terminal 19. With a positive signal at control grid terminal 43 the cathode potential of the cathode follower 42 is raised sufficiently to back bias and cut off the diode 44.

The circuit parameters are chosen so that resistors 10 and 11 are equal, on the order of 75 ohms, for example; resistors 15 and 16 are equal and larger, on the order of 150 ohms each, for example; and resistors 21 and 24 are equal and the largest, on the order of 1500 ohms each in the example chosen. The circuit is thus symmetrical about the input bridge terminals 12 and 17 whereby the potentials at these points are equal when both switches are closed and also when both switches are open. When both switches are closed points 18 and 19 are +V and ground respectively while when both switches are open terminals 18 and 19 are both floating. Thus, in either condition of coincidence there is no potential difference across the bridge input terminals and, therefore, no potential difference between the bridge output terminals 22 and 25.

Assuming the voltage +V to be 28 volts with the exemplary resistance values given above, when switch 30 is closed and switch 31 is open terminals 18 and 13 are at +28, point 14 is at ground and point 19 is floating. Current will flow through the first voltage divider from terminal 13 to 14 to establish at terminal 12 a voltage of 14 volts which will substantially be the voltage at output bridge terminal 22. Current will also flow from switch 30 at terminal 18 through resistor 15, through diode 26 and thence through resistors 24 and 11 to terminal 14. A small voltage drop occurs across resistor 15 whereby the voltage at terminal 25 will be on the order of 26 volts, some 12 volts higher than terminal 22.

With switch 30 open and 31 closed terminal 18 is floating and terminal 19 is at ground. Terminal 12 is still at 14 volts and a second current path is now provided from terminal 13 through resistors 10 and 21, diode 23, resistor 16 and switch 31 to ground. Terminal 25 is substantially at 14 volts while a relatively large voltage drop occurs across resistors 10 and 21 to place terminal 22 at a voltage slightly above 1 volt. Again there is a difference of some 12 volts between terminals 22 and 25 with the latter still being higher. Thus, it will be seen that for either condition of switch coincidence there is no signal between terminals 22 and 25 while for either condition of lack of coincidence there appears between the bridge or detector output terminals 22 and 25 a potential difference of approximately 12 volts, for the exemplary values chosen, which is poled in the same direction for the two conditions of lack of coincidence.

For detection of the signal indicating lack of coincidence there may be utilized any one of many well-known voltage or current responsive circuits of which a relay is selected for purposes of illustration. The output relay may comprise a coil 45 connected between output terminals 22 and 25 which is arranged upon energization thereof to close a normally open switch 46. The latter may be connected via terminals 47 and 48 in any suitable utilization circuit.

For comparison or coincidence detection of additional pairs of input signals or switching devices additional detectors each identical to that described above may be provided with the bridge circuit of each such additional detector having output terminals connected in common to output terminals 22 and 25 of the first detector whereby the single output relay 45, 46 may be utilized to provide indication of total coincidence or lack of coincidence of the signals of any single pair. However, for use with multiple channels of coincidence detection the detector described above is peculiarly adapted for an arrangement wherein several of the components of the first coincidence detector in addition to the output sensing coil 45 may be utilized in common for all of the coincidence detectors of any group of detectors. The drawing illustrates such an arrangement having second and third coincidence detecting channels 50 and 51 each similar in function and operation to the first described coincidence detecting channel and both utilizing in common the first voltage divider comprising resistors 10 and 11 and its voltage source and the two bridge legs comprising resistors 21 and 24. Thus, for each additional channel there is required only a single pair of additional diodes and a second voltage divider corresponding to the switch controlled voltage divider comprising resistors 15 and 16. While only two additional coincidence detecting channels are illustrated, it will be readily appreciated that any reasonable number of such additional channels may be utilized.

The second coincidence detecting channel 50 is utilized to detect coincidence of the conditions of switching devices 52 and 53 here illustrated as simple single pole double throw switches which may be actuated mechanically or electro-magnetically by a relay coil or hole sensing fingers of card handling apparatus not shown. It is to be understood that the switches 52 and 53, which may alternatively be identical to switches 30 and 31, may comprise any suitable two state device which will alternatively connect and disconnect the detector input to and from a voltage of +V for the one switch and to and from ground potential for the other switch. The switch controlled voltage divider for the coincidence detecting channel 50 includes resistors 54 and 55 interconnected at intermediate terminal 56 and connected at its end terminals to switch controlled detector input terminals 57 and 58. Thus, the switches 52 and 53 shown in open position will, when closed, connect input terminals 57 and 58 to +V and ground respectively. The coincidence detector channel 50 further includes diodes 59 and 60 which are oppositely poled and analogous to diodes 23 and 26 of the first detector channel. The diodes are connected in common to intermediate terminal 56 of the switch controlled voltage divider and each is connected at the other side thereof to the bridge output terminals 22 and 25 via leads 61 and 62, respectively. Thus, the diode pair 59, 60 together with the resistors 21 and 24 form a bridge circuit similar to the bridge circuit of the first detector channel. This bridge circuit has a pair of output terminals 22 and 25 which are identical with the output terminals of the other detectors.

In the same manner, an additional or third coincidence detecting channel 51 will comprise a switch controlled voltage divider having resistors 64 and 65 coupled to each other at intermediate terminal 66 and to the opposite sides of +V and ground of the potential source through the input switching devices 67 and 68. The channel 51 also includes the oppositely poled diodes 69 and 70 connected in common to point 66 and connected respectively to output terminals 22 and 25 via leads 61 and 62 respectively. The detector channel 51 again includes the divider 10, 11 common to all channels, the resistors 21, 24 common to all channels and the output sensing coil 45 common to all channels. Thus, it will be seen that each coincidence detector channel includes a pair of voltage dividers of which that comprising resistors 10 and 11 is common to all. Each channel includes a second or switch controlled divider and a pair of diodes which are individual to the particular channel. For each channel there is provided a pair of oppositely directed unidirectional current paths between the intermediate terminals of the two dividers of the channel. The sensing coil 45 is connected in common to the common output terminals of each coincidence detecting channel. Therefore, if there is coincidence between the conditions of the switches of each pair whether such coincidence be that one pair of switches is open and other pairs are closed or vice versa, there will be no signal to be detected by coil 45. Conversely, if there is a lack of coincidence of any single pair of switching devices coil 45 is energized to provide the desired output signal.

It is to be understood that for optimum operation the switch controlled dividers 15—16, 54—55, and 64—65 would be identical, each comprising equal resistors of 150 ohms when used with components of the values indicated above. Similarly, the several diodes 23 and 26, 59—60 and 69—70 will be of like characteristics and may be of the type HDZ 160. While these unidirectional devices are shown as crystal rectifiers it will be readily understood that there may be utilized other functionally similar unidirectional devices such as vacuum tubes or transistors.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A coincidence detector comprising a first voltage divider having an intermediate terminal, a potential source connected across said first divider, first and second switch means, a second voltage divider having an intermediate terminal and coupled across said potential source through said first and second switch means, said first switch means being connected between one end terminal of said second divider and one side of said source, said second switch means being connected between a second end terminal of said second divider and the other side of said source, a bridge circuit having input terminals respectively coupled with said intermediate terminals for providing a pair of mutually independent oppositely directed unidirectional current paths between said intermediate terminals, and a pair of output terminals in said bridge circuit providing an output indicative of the relation between signals in said current paths.

2. A coincidence detector comprising first and second voltage dividers each having an intermediate terminal and first and second end terminals, means for establishing predetermined potentials at said end terminals of said first divider, first and second switching devices for respectively controlling the potentials at respective end terminals of said second divider, means for providing a pair of mutually independent oppositely directed unidirectional current paths between said intermediate terminals, and means connected between said paths for comparing the currents in said paths.

3. A coincidence detector comprising a plurality of voltage dividers each having a pair of end terminals and an intermediate terminal, means for establishing preselected potentials at the end terminals of one of said dividers, a plurality of pairs of switching means, each last-mentioned pair being respectively individual to a different one of the others of said dividers, the switching means of each pair being connected to respectively control opposite end terminals of the divider individual thereto, means for providing a plurality of pairs of oppositely directed unidirectional current paths connected in common to said one divider, each pair of paths individually connecting the intermediate terminal of said one divider and the intermediate terminal of a different one of the others of said dividers, and means for comparing the currents in the paths of at least one of said pairs of paths.

4. A coincidence detector for simultaneously comparing the signals of each of a plurality of pairs of input signals comprising a plurality of coincidence detecting channels each individual to a different one of said input signal pairs; said channels including a first voltage divider common to all of said channels and having a pair of end terminals and an intermediate terminal, and means for establishing preselected potentials at said end terminals; each channel including a second voltage divider individual thereto and having a pair of end terminals and an intermediate terminal, means responsive to the signals of the input pair to which the channel is individual for controlling the potentials at respective end terminals of said second divider, and means for providing a pair of oppositely directed unidirectional current paths between said intermediate terminals of said first and second dividers; said last-mentioned means including an impedance in a first of each of said pairs of paths common to all of said first paths and an impedance in a second of each of said pairs of paths common to all of said second paths; and means for comparing the currents in the paths of at least one of said channels.

5. A coincidence detector comprising a potential source, first and second equal impedances series connected across said source, third and fourth series connected impedances of equal magnitude greater than the magnitude of said first and second impedances, first and second switches for respectively establishing at opposite ends of said third and fourth series connected impedances potentials respectively equal to the potentials at opposite sides of said source, first and second oppositely poled unidirectional devices each connected at one side thereof to the junction of said third and fourth impedances, fifth and sixth equal impedances each connected in common at one side thereof to the junction of said first and second impedances, said fifth and sixth impedances each being of magnitude greater than said third and fourth impedances and each connected at the other side thereof to the other side of a respective one of said unidirectional devices, the junctions of said unidirectional devices with said fifth and sixth impedances providing output terminals of said detector.

6. A coincidence detector comprising first and second voltage dividers each having an intermediate terminal and first and second end terminals, means for establishing predetermined potentials at said end terminals of said first divider, first and second switching devices for respectively controlling the potentials at respective end terminals of said second divider, first and second means for providing first and second oppositely directed unidirectional current paths between said intermediate terminals, each said path including an impedance element, a third voltage divider having an intermediate terminal and first and second end terminals, third and fourth switching devices for respectively controlling the potentials at respective end terminals of said third divider, third and fourth means for providing third and fourth oppositely directed unidirectional current paths between the intermediate terminals of said first and third dividers, said third and fourth paths each including a respective one of said impedance elements, and means for comparing the currents in at least one of said pairs of paths.

7. Apparatus for comparing two signals comprising a first voltage divider having end terminals and an intermediate terminal, means for establishing predetermined potentials at said end terminals, the impedances of said divider between said intermediate terminal and each end terminal being equal, a second voltage divider having end terminals and an intermediate terminal and having equal impedances between its intermediate terminal and respective end terminals thereof, said end terminals of said second divider being adapted to receive respective signals to be compared, means for providing first and second oppositely directed unidirectional current paths between the intermediate terminals of said first and second dividers, said paths having mutually equal impedances, and means for detecting the relative current flow of said paths.

References Cited in the file of this patent

UNITED STATES PATENTS

| | | |
|---|---|---|
| 2,498,103 | Wojciechowski | Feb. 21, 1950 |
| 2,676,210 | Oberman et al. | Apr. 20, 1954 |
| 2,676,286 | Buchner | Apr. 20, 1954 |
| 2,811,707 | Henning et al. | Oct. 29, 1957 |
| 2,883,529 | Marantette | Apr. 21, 1959 |

FOREIGN PATENTS

| | | |
|---|---|---|
| 156,443 | Australia | May 12, 1954 |